(12) United States Patent
Nguyen Trung et al.

(10) Patent No.: US 10,417,064 B2
(45) Date of Patent: Sep. 17, 2019

(54) METHOD OF RANDOMLY DISTRIBUTING DATA IN DISTRIBUTED MULTI-CORE PROCESSOR SYSTEMS

(71) Applicant: MILITARY TELECOMMUNICATION GROUP (VIETTEL), Hanoi (VN)

(72) Inventors: Hai Nguyen Trung, Hanoi (VN); Chinh Vu Duc, Hanoi (VN); Bang Le Thanh, Hanoi (VN); Thuy Nguyen Thi Thu, Hanoi (VN)

(73) Assignee: Military Industry—Telecommunication Group (Viettel), Hanoi (VN)

( * ) Notice: Subject to any disclaimer, the term of this patent is extended or adjusted under 35 U.S.C. 154(b) by 177 days.

(21) Appl. No.: 15/633,743

(22) Filed: Jun. 26, 2017

(65) Prior Publication Data

US 2018/0067786 A1 Mar. 8, 2018

(30) Foreign Application Priority Data

Sep. 7, 2016 (VN) .............................. 1-2016-03331

(51) Int. Cl.
| | |
|---|---|
| *G06F 9/54* | (2006.01) |
| *G06F 9/46* | (2006.01) |
| *G06F 17/18* | (2006.01) |
| *H04L 29/02* | (2006.01) |
| *G06F 16/10* | (2019.01) |
| *G06F 16/951* | (2019.01) |
| *H04L 29/08* | (2006.01) |

(52) U.S. Cl.
CPC .............. *G06F 9/544* (2013.01); *G06F 9/465* (2013.01); *G06F 16/10* (2019.01); *G06F 16/951* (2019.01); *G06F 17/18* (2013.01); *H04L 29/02* (2013.01); *H04L 67/1097* (2013.01)

(58) Field of Classification Search
None
See application file for complete search history.

(56) References Cited

U.S. PATENT DOCUMENTS

| | | | |
|---|---|---|---|
| 2004/0064512 A1* | 4/2004 | Arora ...................... | H04L 51/04 |
| | | | 709/206 |
| 2005/0240591 A1 | 10/2005 | Marceau et al. | |
| 2007/0174369 A1* | 7/2007 | Detlefs ............... | G06F 12/0269 |

(Continued)

OTHER PUBLICATIONS

Office Notification No. 10121/SHTT-SC1 issued in Vietnamese Patent Application No. 1-2016-03331 from National Office of Intellectual Property of Vietnam, dated Mar. 29, 2018.

(Continued)

*Primary Examiner* — Tuan C Dao

(74) *Attorney, Agent, or Firm* — Baker & McKenzie LLP

(57) ABSTRACT

The present disclosure relates to data distribution amongst nodes in a computing system. For example, a controller device of the computing system may first identify one or more nodes in a network that are available for data processing and/or storage tasks. The controller device may next assign data processing and/or storage tasks to one or more nodes. Data processing and/or storage tasks may be efficiently (e.g., randomly and/or evenly) distributed amongst one or more core processors of the assigned nodes. Techniques described herein help to balance the utilization of computing resources and minimize the risk of lost data during reconfigurations and/or network failures.

20 Claims, 10 Drawing Sheets

(56) References Cited

U.S. PATENT DOCUMENTS

| | | | |
|---|---|---|---|
| 2013/0036289 A1* | 2/2013 | Welnicki | G06F 3/0608 |
| | | | 711/173 |
| 2013/0263151 A1 | 10/2013 | Li et al. | |
| 2015/0312144 A1* | 10/2015 | Gobriel | H04L 45/7453 |
| | | | 709/242 |
| 2017/0351555 A1* | 12/2017 | Coffin | G06F 9/5016 |
| 2018/0060318 A1* | 3/2018 | Yang | G06F 16/2255 |

OTHER PUBLICATIONS

Ko, Steve, University at Buffalo Computer Sciences and Engineering, presentation slides "CSE 486/586 Distributed Systems Distributed Hash Table", Spring 2012.
Hoa, Van Le, Master's Thesis, "Technical Table of Grade and Application Development in the Hanging Network", Hanoi University of Technology, Feb. 25, 2012.
Notification No. 31321/SHTT-SC from Vietnam Intellectual Property Office in Vietnamese Patent Application No. 1-2016-03331; dated Sep. 20, 2018.

\* cited by examiner

METHOD OF RANDOMLY DISTRIBUTING DATA IN DISTRIBUTED MULTI-CORE PROCESSOR SYSTEMS

TECHNICAL FIELD

This disclosure is directed to methods of randomly distributing data in distributed multi-core processor systems, suitably assigned to, in order of preference:

1) USPC 719/312 or 719/316 (Art Unit 2194) corresponding to CPC G06F 09/544 and G06F 09/465 respectively;

2) USPC 707/705 or 707/821 (Art Unit 2161) corresponding to CPC G06F 17/30864 and G06F 17/30067 respectively; and 3) USPC 709/238 or 709/246 (Art Unit 2447) corresponding to CPC H04L 29/00.

CROSS REFERENCE TO RELATED APPLICATION

This application claims priority to Vietnamese Patent Application No. 1-2016-03331, filed Sep. 7, 2016, the contents of which are hereby incorporated by reference in entirety.

BACKGROUND

Processing and/or storing high volumes of data in computing systems often requires vast amounts of computing resources. As such, a computing system may utilize multiple nodes (e.g., computers, servers, databases, processors, memories, and/or the like) for processing and/or storing data more efficiently. However, without a method of efficiently distributing data that is to be processed and/or stored by the computing system amongst nodes, the computing system may not utilize its available computing resources in an optimal manner. Therefore, there is a need for efficient distribution of data throughout the computing system.

BRIEF SUMMARY

The present disclosure relates to efficient data distribution amongst nodes of a computing system. A controller device of the computing system may first identify one or more nodes of a network that are purposed for data processing (e.g., database updating and/or other data storage tasks). These nodes may include a plurality of core processors for processing and/or storing data. The controller device may obtain an IP address of each identified node and then utilize a hash function to transform each IP address into a 64-bit node hash value. A portion of each generated node hash value may serve as a node hash index of the corresponding node. For example, a node hash index may be represented by the first n-bits of the node hash value. The control system may then input these node hash indexes into a node hash table, which may provide a summary of all nodes in the network that are available for data processing. Nodes may be added and/or removed during operation.

When data (e.g., one or more elements, numbers, values, information, and/or the like) needs to be processed by the computing system, such as during intake of new data and/or a system reconfiguration, the controller device may assign the required data processing tasks and/or storage of data to one or more identified nodes. The controller device may further assign the data to one or more core processors of nodes using a series of steps.

First, the controller device receives and/or identifies an element (e.g., data, an object, an element index, information, and/or the like) to be processed. Using a hash function, the controller device transforms the element into a 64-bit element hash value. A portion of the generated hash value may serve as an element hash index of the element. For example, an element hash index may be represented by the first n-bits of the element hash value.

Next, the controller device may compare the element hash index with the node hash index table. The controller device identifies a node hash index that is closest in value to the value of the element hash index. The controller device then assigns the element hash index (and thus the element) to the node associated with the node hash index that is closest in value to the element hash index of the element for storage of a master copy of the element at the assigned node. The element hash index (and the element) may also be assigned to a number of other nodes with the next-closest hash index values for the purpose of storing replica copies of the element.

Further, the controller device may utilize an algorithm for determining in which core processor(s) of the assigned node(s) an element is to be stored. The integer remainder of a modulo operation may indicate the appropriate core processor of the node to which the element is to be assigned. Assigning the element to specific core processors of nodes in this more-or-less random manner ensures that data is distributed evenly amongst the core processors, thereby maximizing utilization of available computing resources.

Lastly, because replica copies are also stored at multiple nodes, risks associated with data loss in the event of a network failure are effectively minimized. Additionally, replica copies enable the efficient recall of elements (e.g., data) when adding and/or removing of nodes. Overall, data distribution techniques described herein provide increased efficiency and improve upon current data processing capabilities.

BRIEF DESCRIPTION OF THE DRAWINGS

Reference is now made to the following detailed description, taken in conjunction with the accompanying drawings. It is emphasized that various features may not be drawn to scale and the dimensions of various features may be arbitrarily increased or reduced for clarity of discussion. Further, some components may be omitted in certain figures for clarity of discussion.

DETAILED DESCRIPTION

System Environment

Figure 1A:
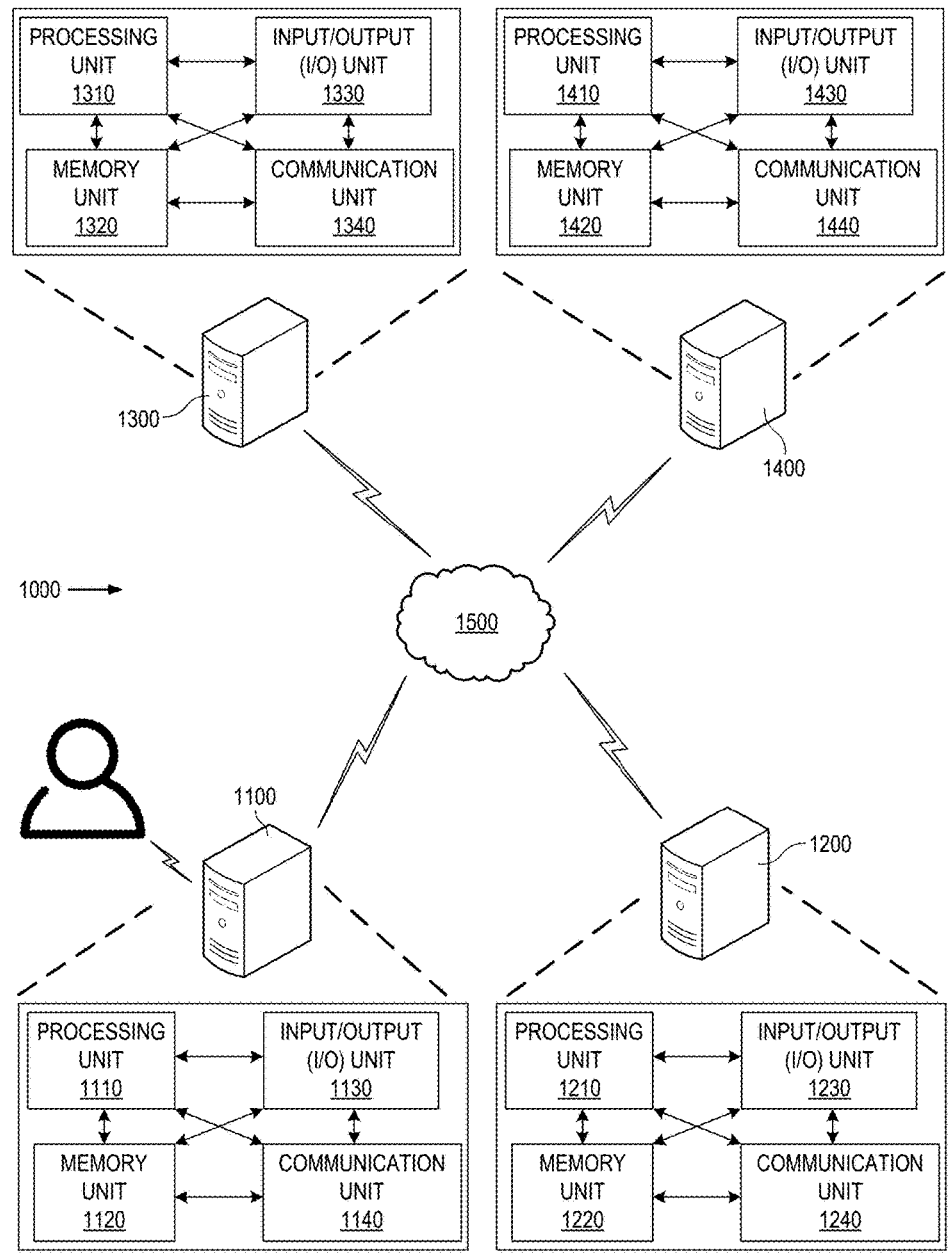
FIG. 1A illustrates an exemplary computing system, in accordance with embodiments described herein.
Figure 1B:
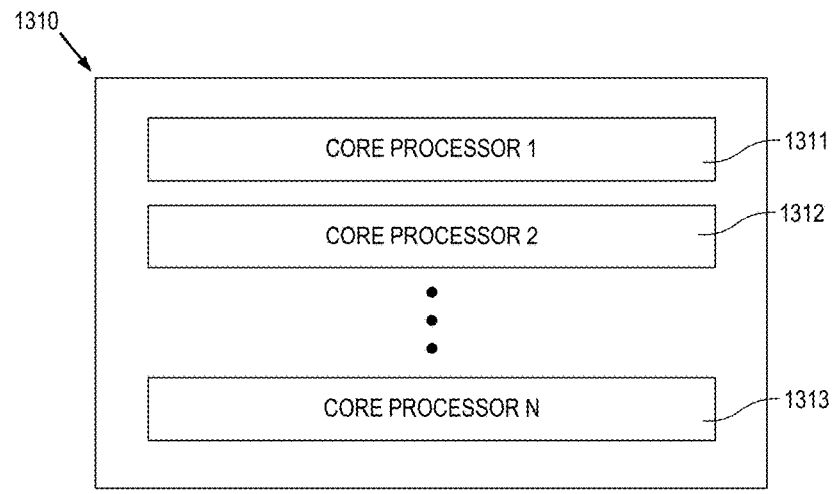
FIG. 1B illustrates exemplary core processors of nodes, in accordance with embodiments described herein.
Figure 1B:
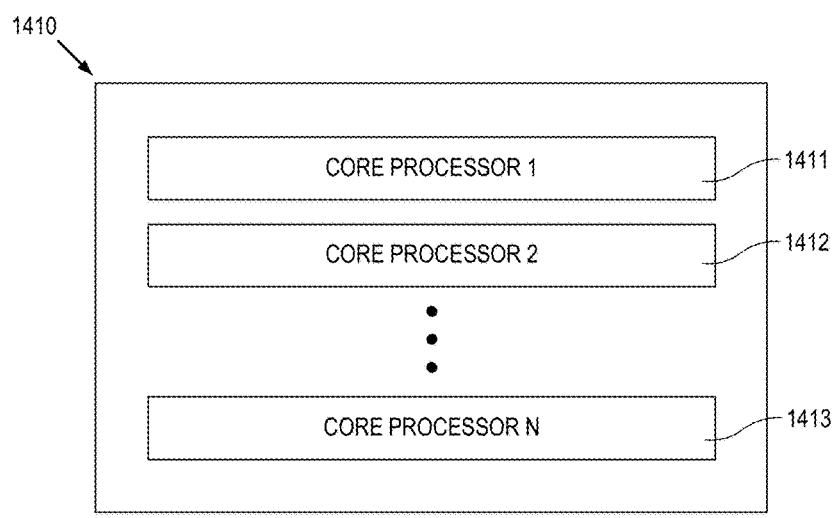

FIG. 1 illustrates an exemplary computing system 1000 for performing operations described herein. The computing system 1000 may include a client device 1100, a controller device 1200, and nodes 1300, 1400. Although one client device 1100, one controller device 1200, and two nodes 1300, 1400 and are illustrated in the presently described embodiment, the concepts disclosed herein may be similarly applicable to an embodiment that includes more than one client device, more than one controller device, and/or different numbers of nodes.

The client device 1100, the controller device 1200, and the nodes 1300, 1400 may be operatively and/or communicatively coupled to each other via a network 1500. In some embodiments, the network 1500 may include a plurality of networks. In some embodiments, the network 1500 may include any wireless and/or wired communications network that facilitates communication between the client device 1100, the controller device 1200, and the nodes 1300 and 1400. For example, the one or more networks may include an Ethernet network, a cellular network, a computer network, the Internet, a wireless fidelity (Wi-Fi) network, a light fidelity (Li-Fi) network, a Bluetooth network, a radio frequency identification (RFID) network, a near-field communication (NFC) network, a laser-based network, and/or the like.

In some embodiments, the client device 1100 may include a handheld computing device, a smart phone, a tablet, a laptop computer, a desktop computer, a personal digital assistant (PDA), a smart watch, a wearable device, a biometric device, an implanted device, a camera, a video recorder, an audio recorder, a touchscreen, a computer server, a virtual server, a virtual machine, and/or a communications server. In some embodiments, the client device 1100 may include a plurality of client devices configured to communicate with one another and/or perform operations described herein.

The client device 1100 may include various elements of a computing environment as described herein. For example, as depicted in FIG. 1, the client device 1100 may include a processing unit 1110, a memory unit 1120, an input/output (I/O) unit 1130, and/or a communication unit 1140. Each of the processing unit 1110, the memory unit 1120, the input/output (I/O) unit 1130, and/or the communication unit 1140 may include one or more subunits as described herein for performing operations associated with data distribution.

Briefly, the client device 1100 may be responsible for the intake of data that is to be processed and/or stored by the computing system 1000. For example, the client device 1100 may receive and/or retrieve data that is to be processed and/or stored by the computing system 1000. Additionally, the client device 1100 may transmit data that is to be processed and/or stored by the computing system 1000 to the controller 1200 for analysis and/or further processing.

In some embodiments, the controller device 1200 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The controller device 1200 may include a plurality of computing devices configured to communicate with one another and/or implement load-balancing techniques described herein. In some embodiments, the controller device 1200 may be included in the client device 1100 and/or a node 1300, 1400.

The controller device 1200 may include various elements of a computing environment as described herein. For example, the controller device 1200 may include a processing unit 1210, a memory unit 1220, an input/output (I/O) unit 1230, and/or a communication unit 1240. Each of the processing unit 1210, the memory unit 1220, the input/output (I/O) unit 1320, and/or the communication unit 1240 may include one or more subunits and/or other computing instances as described herein for performing operations associated with data distribution.

Briefly, the controller device 1200 may be responsible for the assignment of data (e.g., incoming data, received data, retrieved data, indexed data, and/or the like) to one or more nodes 1300, 1400 for processing and/or storage. For example, the controller device 1200 may receive data that is to be processed and/or stored by the computing system 1000 from the client device 1100. The controller device 1100 may then, according to operations described in more detail below, assign the received data to one or more nodes 1300, 1400 (and/or one or more core processors of the one or nodes 1300, 1400) for processing and/or storage. The controller device 1200 may then transmit the received data to the one or more nodes 1300, 1400 for processing and/or storage based on the assignment.

In some embodiments, each node 1300, 1400 may include a computing device such as a mainframe server, a content server, a communication server, a laptop computer, a desktop computer, a handheld computing device, a smart phone, a smart watch, a wearable device, a touch screen, a biometric device, a video processing device, an audio processing device, a virtual machine, a cloud-based computing solution and/or service, and/or the like. The nodes 1300, 1400 may include a plurality of computing devices configured to communicate with one another and/or implement load-balancing techniques described herein.

Each node 1300, 1400 may include various elements of a computing environment as described herein. For example, each node 1300, 1400 may include a processing unit 1310, 1410 a memory unit 1320, 1420 an input/output (I/O) unit 1330, 1430 and/or a communication unit 1340, 1440, respectively. Each of the processing unit 1310, 1410, the memory unit 1320, 1420, the input/output (I/O) unit 1330, 1430, and/or the communication unit 1340, 1440 may include one or more subunits and/or other computing instances as described herein for performing operations associated with equal data distribution.

Additionally, as illustrated in FIG. 2, the respective processing unit 1310, 1410 of each node 1300, 1400 may include one or more (e.g., any number of) core processors. For example, processing unit 1310 of node 1300 may include a first core processor 1311, a second core processor 1312, an n core processor 1313, and so on. Similarly, processing unit 1410 of node 1400 may include a first core processor 1411, a second core processor 1412, an n core processor 1413, and so on.

Briefly, the nodes 1300, 1400 may be responsible for the processing and/or storage of data. For example, node 1300 may receive data that is to be processed and/or stored from the controller device 1200. The received data may be distributed to the one or more core processors 1311, 1312, 1313 for processing and/or storage based on the assignments generated by the controller device 1200. The one or more core processors 1311, 1312, 1313 of the node 1300 may then process and/or store the data as instructed.

Computing Architecture

Figure 2A:
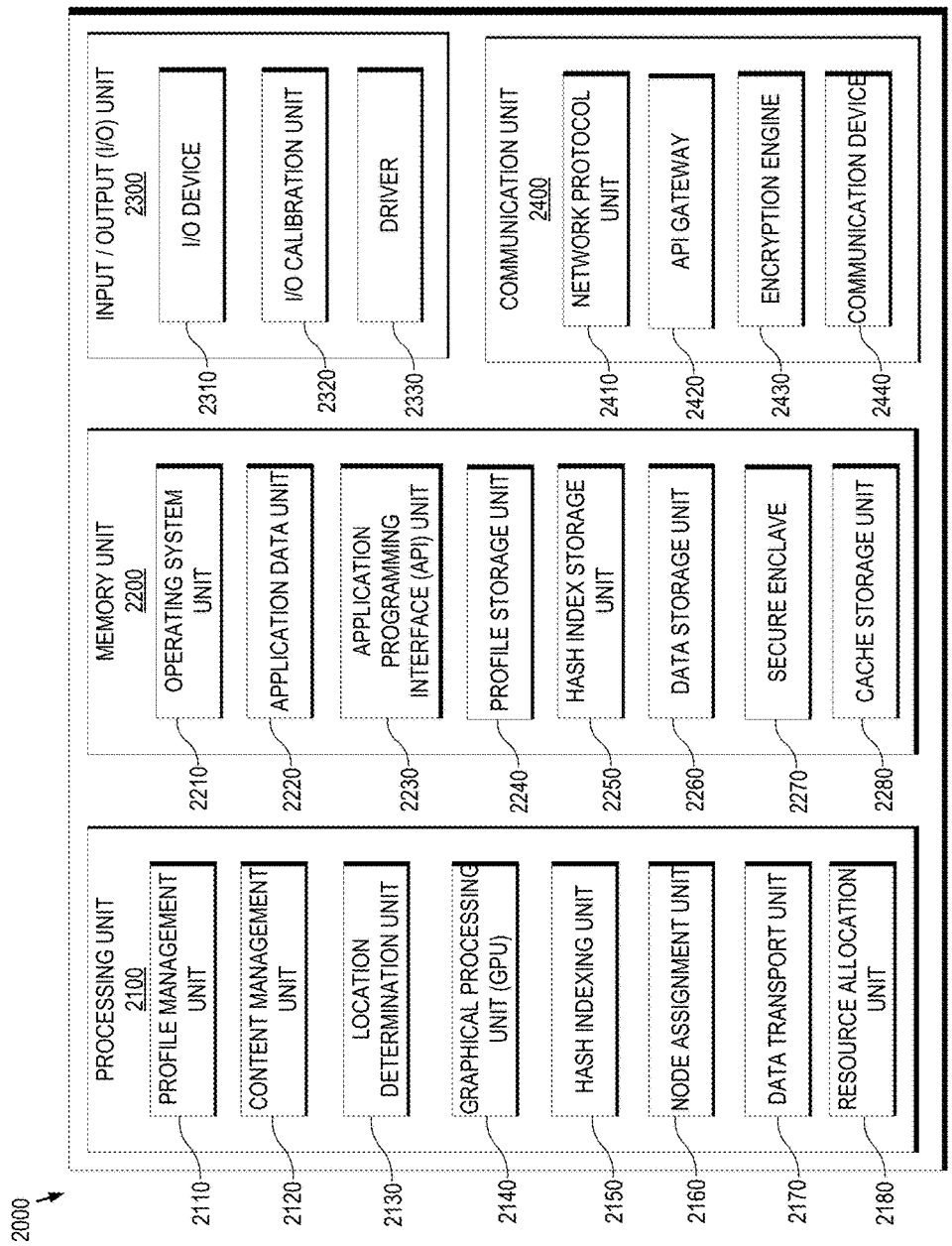
FIG. 2A illustrates an exemplary computing environment, in accordance with embodiments described herein.
Figure 2B:
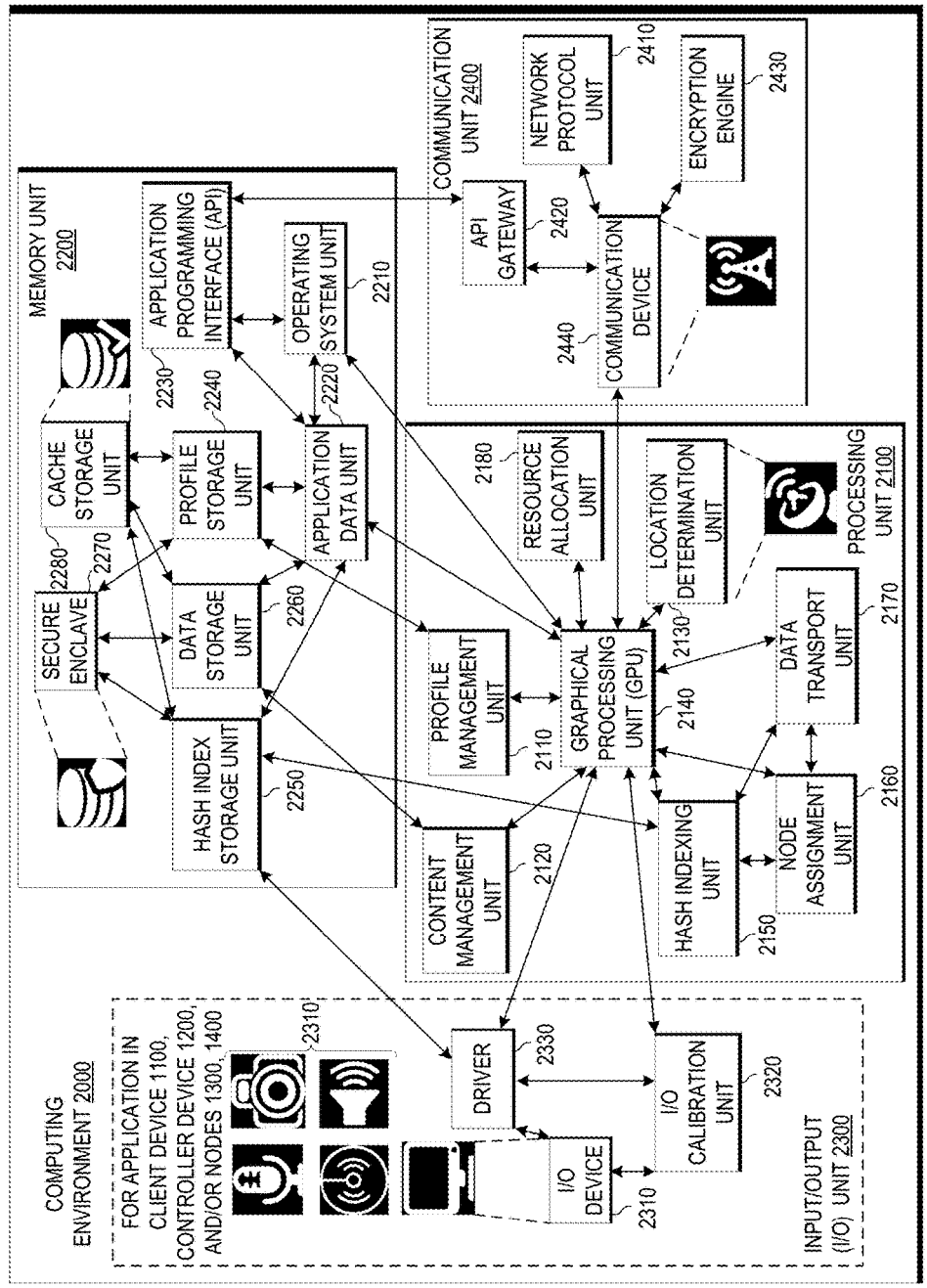
FIG. 2B illustrates an exemplary connectivity diagram of the computing environment of FIG. 2A, in accordance with embodiments described herein.

FIG. 2A and FIG. 2B illustrate exemplary functional and system diagrams of a computing environment 2000 for performing data distribution operations described herein. Specifically, FIG. 2A provides a functional block diagram of the computing environment 2000, whereas FIG. 2B provides a detailed system diagram of the computing environment 2000.

As seen in FIG. 2A and FIG. 2B, the computing environment 2000 may include a processing unit 2100, a memory unit 2200, an I/O unit 2300, and a communication unit 2400. Each of the processing unit 2100, the memory unit 2200, the I/O unit 2300, and the communication unit 2400 may include one or more subunits for performing operations associated with equal data distribution as described herein. Further, each unit and/or subunit of the computing environment 2000 may be operatively and/or otherwise communicatively coupled with each other so as to facilitate performance of operations described herein. The computing environment 200 including any of its units and/or subunits may include general hardware, specifically-purposed hardware, and/or software.

Importantly, the computing environment 2000 of FIG. 2A and/or FIG. 2B may be included in one or more of the client device 1100, the controller device 1200, and/or the nodes 1300, 1400 of FIG. 1A. Additionally, any units and/or subunits described herein with reference to the computing environment 2000 of FIG. 2A and/or FIG. 2B may be included in one or more of the client device 1100, the controller device 1200, and/or the nodes 1300, 1400 of FIG. 1A.

For example, the processing unit 2100 of the computing environment 2000 of FIG. 2A and/or FIG. 2B may be included in one or more of the processing units 1110, 1210, 1310, 1410 of FIG. 1A. Similarly, the memory unit 2200 of the computing environment 2000 of FIG. 2A and/or FIG. 2B may be included in one or more of the memory units 1120, 1220, 1320, 1420 of FIG. 1A. In some embodiments, the I/O unit 2300 of the computing environment 2000 of FIG. 2A and/or FIG. 2B may be included in one or more of the I/O units 1130, 1230, 1330, 1430 of FIG. 1A. The communication unit 2400 of the computing environment 2000 of FIG. 2A and/or FIG. 2B may also be included in one or more of the communication units 1140, 1240, 1340, 1440 of FIG. 1A.

The processing unit 2100 may control one or more of the memory unit 2200, the I/O unit 2300, and the communication unit 2400 of the computing environment 2000, as well as any included subunits, elements, components, devices, and/or functions performed by the memory unit 2200, the I/O unit 2300, and the communication unit 2400. The described sub-elements of the computing environment may also be included in similar fashion in any of the other units and/or devices included in the computing system 1000 of FIG. 1A. Additionally, any actions described herein as being performed by a processor may be taken by the processing unit 2100 of FIG. 2A and/or FIG. 2B alone and/or by the processing unit 2100 in conjunction with one or more additional processors, units, subunits, elements, components, devices, and/or the like. Additionally, while one processing unit 2100 may be shown in FIG. 2A and/or FIG. 2B, multiple processing units may be present and/or otherwise included in the computing environment 2000 or elsewhere in the overall system (e.g., computing system 1000 of FIG. 1A). Thus, while instructions may be described as being executed by the processing unit 2100 (and/or various subunits of the processing unit 2100), the instructions may be executed simultaneously, serially, and/or otherwise by one or multiple processing units 2100 on one or more devices.

In some embodiments, the processing unit 2100 may be implemented as one or more computer processing unit (CPU) chips and/or graphical processing unit (GPU) chips and may include a hardware device capable of executing computer instructions. The processing unit 2100 may execute instructions, codes, computer programs, and/or scripts. The instructions, codes, computer programs, and/or scripts may be received from and/or stored in the memory unit 2200, the I/O unit 2300, the communication unit 2400, subunits and/or elements of the aforementioned units, other devices and/or computing environments, and/or the like.

In some embodiments, the processing unit 2100 may include, among other elements, subunits such as a profile management unit 2110, a content management unit 2120, a location determination unit 2130, a graphical processing unit (GPU) 2140, a hash indexing unit 2150, a node assignment unit 2160, a data transport unit 2170, and/or a resource allocation unit 2180. Each of the aforementioned subunits of the processing unit 2100 may be communicatively and/or otherwise operably coupled with each other.

The profile management unit 2110 may facilitate generation, modification, analysis, transmission, storage, and/or presentation of a device profile associated with a client device, a controller device, and/or a node (e.g., client device 1100, controller device 1200, and/or nodes 1300, 1400 of FIG. 1A). For example, the profile management unit 2110 may prompt a device to transmit information pertaining to location, computing resource capacity and/or availability, current usage, and/or the like. The profile management unit 3451 may receive, process, analyze, organize, store, and/or otherwise transform any data received from the device so as to generate a device profile of the device that includes location information, information pertaining to usage and/or available resource such as processing power and storage capacity, and/or the like.

The content management unit 2120 may facilitate generation, modification, analysis, transmission, and/or presentation of media content. For example, the content management unit 2120 may control the audio-visual environment and/or appearance of data during execution of various processes. Media content for which the content management unit 2120 may be responsible may include user interfaces, advertisements, images, text, themes, audio files, video files, documents, and/or the like. In some embodiments, the content management unit 2120 may also interface with a third-party content server and/or memory location.

The location determination unit 2130 may facilitate detection, generation, modification, analysis, transmission, and/or presentation of location information associated with one or more devices (e.g., the client device 1100, the controller 1200, and/or the nodes 1300, 1400 of FIG. 1A). Location information may include an Internet protocol (IP) address, global positioning system (GPS) coordinates, a media access control (MAC) address, geolocation information, an address, a port number, a zip code, a server number, a proxy name and/or number, device information (e.g., a serial number), and/or the like. In some embodiments, the location determination unit 2130 may utilize various network port analyzers, sensors, radars, and/or other specifically-purposed hardware elements for the location determination unit 2130 to acquire, measure, and/or otherwise transform location information.

The GPU unit 2140 may facilitate generation, modification, analysis, processing, transmission, and/or presentation of media content described above. In some embodiments, the GPU unit 2140 may be utilized to render media content and/or user interfaces for presentation on a computing device. The GPU unit 2140 may also be utilized for receiving user selections and actions via the presented user interfaces, and/or the like. The GPU unit 2140 may also include multiple GPUs and/or central processing units (CPUs) and therefore may be configured to perform and/or execute multiple processes in parallel.

The hash indexing unit 2150 may facilitate the determination, monitoring, updating, and/or storage of hashing operations described herein. For example, the hash indexing unit 2150 may utilize one or more hash functions to generate a hash index (e.g., a hash value) for a device (e.g., client device 1100, controller device 1200, and/or nodes 1300, 1400 of FIG. 1A). In some embodiments, the hash index may include a hashed value of an IP address, a data file, data characteristics, and/or the like. The hashed indexing unit 2150 may also be responsible for storing and maintaining hash indexes of devices and/or data in various tables as described in more detail below.

The node assignment unit 2160 may facilitate the determination of one or more nodes to which data that is to be processed and/or stored is to be assigned for processing and/or storage. For example, the node assignment unit 2160 may determine, as described in more detail below, one or more nodes in which data is to be stored. The node assignment unit 2160 may further assign data to be processed and/or stored by one or more specific core processors of one or more nodes. The node assignment unit 2160 may also utilize hash indexes of both location information (e.g., IP addresses) and data characteristics of data to assign the data to one or more nodes (and/or one or more core processors of one or more nodes) for processing and/or storage.

The data transport unit 2170 may facilitate the receipt, retrieval, routing, and/or transmission of data that is to be processed and/or stored by the computing system described herein (e.g., computing system 1000 of FIG. 1A). For example, the data transport unit 2170 may receive and/or retrieve data that is to be processed and/or stored from a client device (e.g., client device 1100 of FIG. 1A) and/or a storage location in a node (e.g., node 1300 of FIG. 1A), route the data to a controller device (e.g., controller device 1200 of FIG. 1A) for assignment to one or more nodes (e.g., nodes 1300, 1400 of FIG. 1A and/or one or more core processors 1311, 1312, 1313, 1411, 1412, 1413 of FIG. 1B) for processing and/or storage, and then transmit the data to the assigned node and/or core processors for processing and/or storage. Additionally, the data transport unit 2170 may facilitate data record updating processes between nodes and/or core processors of nodes as described in more detail below.

The resource allocation unit 2180 may facilitate the determination, monitoring, analysis, and/or allocation of computing resources throughout the computing environment 2000 and/or other computing environments. For example, the computing environment 2000 may be enabled to handle a high volume of (e.g., multiple) data processing and/or storage requests received from a large number of client devices, as well as simultaneous monitoring storage capabilities and location information associated with nodes. As such, computing resources of the computing environment 2000 utilized by the processing unit 2100, the memory unit 2200, the I/O unit 2300, and/or the communication unit 2400 (and/or any subunit of the aforementioned units) such as processing power, data storage space, network bandwidth, and/or the like may be in high demand at various times during operation. Accordingly, the resource allocation unit 2180 may be configured to manage the allocation of various computing resources as they are required by particular units and/or subunits of the computing environment 2000 and/or other computing environments. In some embodiments, the resource allocation unit 2180 may include sensors and/or other specially-purposed hardware for monitoring performance of each unit and/or subunit of the computing environment 2000, as well as hardware for responding to the computing resource needs of each unit and/or subunit. In some embodiments, the resource allocation unit 2180 may utilize computing resources of a second computing environment separate and distinct from the computing environment 2000 to facilitate performance of a desired operation.

For example, the resource allocation unit 2180 may determine a number of simultaneous requests for data processing and/or storage. The resource allocation unit 2180 may then determine that the number of simultaneous requests for data processing and/or storage meets and/or exceeds a predetermined threshold value. Based on this determination, the resource allocation unit 2180 may determine an amount of additional computing resources (e.g., processing power, storage space of a particular non-transitory computer-readable memory medium, network bandwidth, and/or the like) required by the processing unit 2100, the memory unit 2200, the I/O unit 2300, the communication unit 2400, and/or any subunit of the aforementioned units for safe and efficient operation of the computing environment while supporting the number of simultaneous requests for data processing and/or storage. The resource allocation unit 2180 may then retrieve, transmit, control, allocate, and/or otherwise distribute determined amount(s) of computing resources to each element (e.g., unit and/or subunit) of the computing environment 2000 and/or another computing environment.

In some embodiments, factors affecting the allocation of computing resources by the resource allocation unit 2180 may include the number of simultaneous requests for data processing and/or storage, incoming information associated with data storage capabilities and location of nodes, a duration of time during which computing resources are required by one or more elements of the computing environment 2000, and/or the like. In some embodiments, computing resources may be allocated to and/or distributed amongst a plurality of second computing environments included in the computing environment 2000 based on one or more factors mentioned above. In some embodiments, the allocation of computing resources of the resource allocation unit 2180 may include the resource allocation unit 2180 flipping a switch, adjusting processing power, adjusting memory size, partitioning a memory element, transmitting data, controlling one or more input and/or output devices, modifying various communication protocols, and/or the like. In some embodiments, the resource allocation unit 2180 may facilitate utilization of parallel processing techniques.

In some embodiments, the memory unit 2200 may be utilized for storing, recalling, receiving, transmitting, and/or accessing data, various files, and/or other information during operation of the computing environment 2000. For example, the memory unit 2200 may be utilized for storing, recalling, and/or updating client device or node information, information about requests for storage, incoming data, processed data, retrieved data, and/or the like.

The memory unit 2200 may include various types of data storage media such as solid state storage media, hard disk storage media, virtual storage media, and/or the like. The memory unit 2200 may include dedicated hardware elements such as hard drives and/or servers, as well as software elements such as cloud-based storage drives. For example, the memory unit 2200 may include various subunits such as an operating system unit 2210, an application data unit 2220, an application programming interface (API) unit 2230, a profile storage unit 2240, a hash index storage unit 2250, a data storage unit 2260, a secure enclave 2270, and/or a cache storage unit 2280.

The memory unit 2200 and/or any of its subunits described herein may include random access memory (RAM), read only memory (ROM), and/or various forms of secondary storage. RAM may be used to store volatile data and/or to store instructions that may be executed by the processing unit 2100. For example, the data stored may be a command, instructions, a current operating state of the computing environment 2000, an intended operating state of the computing environment 2000, and/or the like. As a further example, data stored in the memory unit 2200 may include instructions related to various methods and/or functionalities described herein. ROM may be a non-volatile memory device that may have a smaller memory capacity than the memory capacity of a secondary storage. ROM may be used to store instructions and/or data that may be read during execution of computer instructions. In some embodiments, access to both RAM and ROM may be faster than access to secondary storage. Secondary storage may be comprised of one or more disk drives and/or tape drives and may be used for non-volatile storage of data or as an over-flow data storage device if RAM is not large enough to hold all working data. Secondary storage may be used to store programs that may be loaded into RAM when such programs are selected for execution. In some embodiments, the memory unit 2200 may include one or more databases for storing any data described herein. Additionally or alternatively, one or more secondary databases located remotely from the computing environment 2000 may be utilized and/or accessed by the memory unit 2200.

The operating system unit 2210 may facilitate deployment, storage, access, execution, and/or utilization of an operating system utilized by the computing environment 2000 and/or any other computing environment described herein. In some embodiments, the operating system unit 2210 may include various hardware and/or software elements that serve as a structural framework for the processing unit 2100 to execute various operations described herein. The operating system unit 2200 may further store various pieces of information and/or data associated with operation of the operating system and/or the computing environment 2000 as a whole, such as a status of computing resources (e.g., processing power, memory availability, resource utilization, and/or the like), runtime information, modules to direct execution of operations described herein, user permissions, security credentials, and/or the like.

The application data unit 2220 may facilitate deployment, storage, access, execution, and/or utilization of an application utilized by the computing environment 2000 and/or any other computing environment described herein. For example, a user may be required to download, access, and/or otherwise utilize a software application on a client device to facilitate performance of the data distribution operations described herein. As such, the application data unit 2220 may store any information and/or data associated with the application. In some embodiments, a client device and/or a user of a controller device may use information included in the application data unit 2220 to execute various data storage operations via a user interface. The application data unit 2220 may further store various pieces of information and/or data associated with operation of the application and/or the computing environment 2000 as a whole, such as a status of computing resources (e.g., processing power, memory availability, resource utilization, and/or the like), runtime information, user interfaces, modules to direct execution of operations described herein, user permissions, security credentials, and/or the like.

The API unit 2230 may facilitate deployment, storage, access, execution, and/or utilization of information associated with APIs of the computing environment 2000 and/or any other computing environment described herein. For example, the computing environment 2000 may include one or more APIs for various devices, applications, units, subunits, elements, and/or other computing environments to communicate with each other and/or utilize the same data. Accordingly, the API unit 2230 may include API databases containing information that may be accessed and/or utilized by applications, units, subunits, elements, and/or operating systems of other devices and/or computing environments. In some embodiments, each API database may be associated with a customized physical circuit included in the memory unit 2200 and/or the API unit 2230. Additionally, each API database may be public and/or private, and so authentication credentials may be required to access information in an API database.

The profile storage unit 2240 may facilitate deployment, storage, access, and/or utilization of information associated with profiles of client devices, controller devices, and/or nodes by the computing environment 2000 and/or any other computing environment described herein. For example, the profile storage unit 2240 may store information about usage, data storage requests, availability for storage, location information, and the like. In some embodiments, the profile storage unit 2240 may communicate with the profile management unit 2110 to receive and/or transmit information associated with a client device, a controller device, and/or a node.

The hash index storage unit 2250 may facilitate deployment, storage, access, and/or utilization of hashed indexes associated with profiles of client devices, controller devices, and/or nodes by the computing environment 2000 and/or any other computing environment described herein. For example, the hash index storage unit 2250 may store hashed location information (e.g., IP addresses), hashed device identifiers (e.g., serial numbers, and/or the like), hashed values of data (e.g., elements, objects, and/or the like), hashed values of information associated with device capacity, usage, status, and/or availability, and/or the like. In some embodiments, the hash index storage unit 2250 may include one or more tables for storing hash functions and/or hash indexes of one or more client devices, controller devices, and/or nodes. The hash index storage unit 2250 may communicate with the hash indexing unit 2150 to receive and/or transmit hashed values associated with a client device, a controller device, and/or a node.

The data storage unit 2260 may facilitate deployment, storage, access, and/or utilization of data (e.g., any data to be processed and/or stored by the computing system 1000 of FIG. 1A). In some embodiments, the data storage unit 2260 may also facilitate deployment, storage, access, and/or utilization of content information and/or content files such as user interfaces, metadata, and/or the like. The data storage unit 2260 may communicate with one or more nodes and/or one or more core processors of nodes to ensure efficient distribution, processing, and/or storage of data.

The secure enclave 2270 may facilitate secure storage of data. In some embodiments, the secure enclave 2270 may include a partitioned portion of storage media included in the memory unit 2200 that is protected by various security measures. For example, the secure enclave 2270 may be hardware secured. In other embodiments, the secure enclave 2270 may include one or more firewalls, encryption mechanisms, and/or other security-based protocols. Authentication credentials of a user may be required prior to providing the user access to data stored within the secure enclave 2270.

The cache storage unit 2280 may facilitate short-term deployment, storage, access, analysis, and/or utilization of data. For example, the cache storage unit 2280 may be utilized for storing data that is in transit from a client device to a node for storage (e.g., data that has been received and/or retrieved and is currently waiting to be processed and/or stored). In some embodiments, the cache storage unit 2280 may serve as a short-term storage location for data so that the data stored in the cache storage unit 2280 may be accessed quickly. In some embodiments, the cache storage unit 2280 may include RAM and/or other storage media types for quick recall of stored data. The cache storage unit 2280 may include a partitioned portion of storage media included in the memory unit 2200.

The I/O unit 2300 may include hardware and/or software elements for the computing environment 2000 to receive, transmit, and/or present information useful for performing data distribution operations as described herein. For example, elements of the I/O unit 2300 may be used to receive data from a client device, information regarding storage capacity, usage, and/or location from a node and/or other device, and/or the like. In this manner, the computing environment 2000 may use the I/O unit 2300 to interface with client devices, controlling devices, and/or nodes (as well as any other component coupled to the network). As described herein, the I/O unit 2300 may include subunits such as an I/O device 2310, an I/O calibration unit 2320, and/or driver 2330.

The I/O device 2310 may facilitate the receipt, transmission, processing, presentation, display, input, and/or output of information as a result of executed processes described herein. In some embodiments, the I/O device 2310 may include a plurality of I/O devices. In some embodiments, the I/O device 2310 may include one or more elements of a client device, a controlling device, a node, another computing system, a server, and/or a similar device. As such, the I/O device 2310 may include a variety of elements for a user to interface with the computing environment 2000. For example, the I/O device 2310 may include a keyboard, a touchscreen, a button, a sensor, a biometric scanner, a laser, a microphone, a camera, and/or another element for receiving and/or collecting input from a user. Additionally and/or alternatively, the I/O device 2310 may include a display, a screen, a sensor, a vibration mechanism, a light emitting diode (LED), a speaker, a radio frequency identification (RFID) scanner, a barcode scanner, and/or another element for presenting and/or otherwise outputting data to a user. In some embodiments, the I/O device 2310 may communicate with one or more elements of the processing unit 2100 and/or the memory unit 2200 to execute operations described herein.

The I/O calibration unit 2320 may facilitate the calibration of the I/O device 2310. For example, the I/O calibration unit 2320 may detect and/or determine one or more settings of the I/O device 2310, and then adjust and/or modify settings so that the I/O device 2310 may operate more efficiently.

In some embodiments, the I/O calibration unit 2320 may utilize a driver 2330 (or multiple drivers) to calibrate the I/O device 2310. For example, the driver 2330 may include software that is to be installed by the I/O calibration unit 2320 so that an element of the computing environment 2000 (and/or an element of another computing environment) may recognize and/or integrate with the I/O device 2310 for the data distribution processes described herein.

The communication unit 2400 may facilitate establishment, maintenance, monitoring, and/or termination of communications between the computing environment 2000 and other computing environments, third party server systems, and/or the like. The communication unit 2400 may facilitate communication between various elements (e.g., units and/or subunits) of the computing environment 2000. In some embodiments, the communication unit 2400 may include a network protocol unit 2410, an API gateway 2420, an encryption engine 2430, and/or a communication device 2440. The communication unit 2400 may include hardware and/or software elements.

The network protocol unit 2410 may facilitate establishment, maintenance, and/or termination of a communication connection for the computing environment 2000 by way of a network. For example, the network protocol unit 2410 may detect and/or define a communication protocol required by a particular network and/or network type. Communication protocols utilized by the network protocol unit 2410 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for the computing environment 2000 may include transforming and/or translating data from being compatible with a first communication protocol to being compatible with a second communication protocol. In some embodiments, the network protocol unit 2410 may determine and/or monitor an amount of data traffic to consequently determine which particular network protocol is to be used for establishing a secure communication connection, transmitting data, and/or performing other operations as described herein.

The API gateway 2420 may facilitate other devices and/or computing environments to access the API unit 2230 of the memory unit 2200 of the computing environment 2000. For example, a client device (e.g., client device 1100 of FIG. 1A) may access the API unit 2200 of the computing environment 2000 via the API gateway 2420. In some embodiments, the API gateway 2420 may be required to validate user credentials associated with a user of a client device prior to providing access to the API unit 2230 to the user. The API gateway 2420 may also include instructions for the computing environment 2000 to communicate with another device and/or between elements of the computing environment 2000.

The encryption engine 2430 may facilitate translation, encryption, encoding, decryption, and/or decoding of information received, transmitted, and/or stored by the computing environment 2000. Using the encryption engine, each transmission of data may be encrypted, encoded, and/or translated for security reasons, and any received data may be encrypted, encoded, and/or translated prior to its processing and/or storage. In some embodiments, the encryption engine 2430 may generate an encryption key, an encoding key, a translation key, and/or the like, which may be transmitted along with any data content.

The communication device 2440 may include a variety of hardware and/or software specifically purposed for communication. In some embodiments, the communication device 2440 may include one or more radio transceivers, chips, analog front end (AFE) units, antennas, processing units, memory, other logic, and/or other components to implement communication protocols (wired or wireless) and related functionality for facilitating communication for the computing environment 2000. Additionally and/or alternatively, the communication device 2440 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

System Operation

Referring back to FIG. 1A, operation of the system 1000 may begin with the controller device 1200 (herein after "controller device") requesting information from one or more nodes 1300, 1400 (hereinafter "nodes") in a network. The requested information may include location information (e.g., an IP address), status information, usage information, storage capabilities, device identification information, device characteristics such as number of core processors, geographical location, and/or the like. In response to transmitting a request for this information, the controller device may not only identify one or more nodes coupled to the network, but also understand each identified node's availability to assist with processing and/or storage operations. The controller device may transmit these requests to nodes and/or receive this information from nodes periodically, at various intervals, continuously, in real time, in response to receiving a user input, and/or the like.

Figure 3:
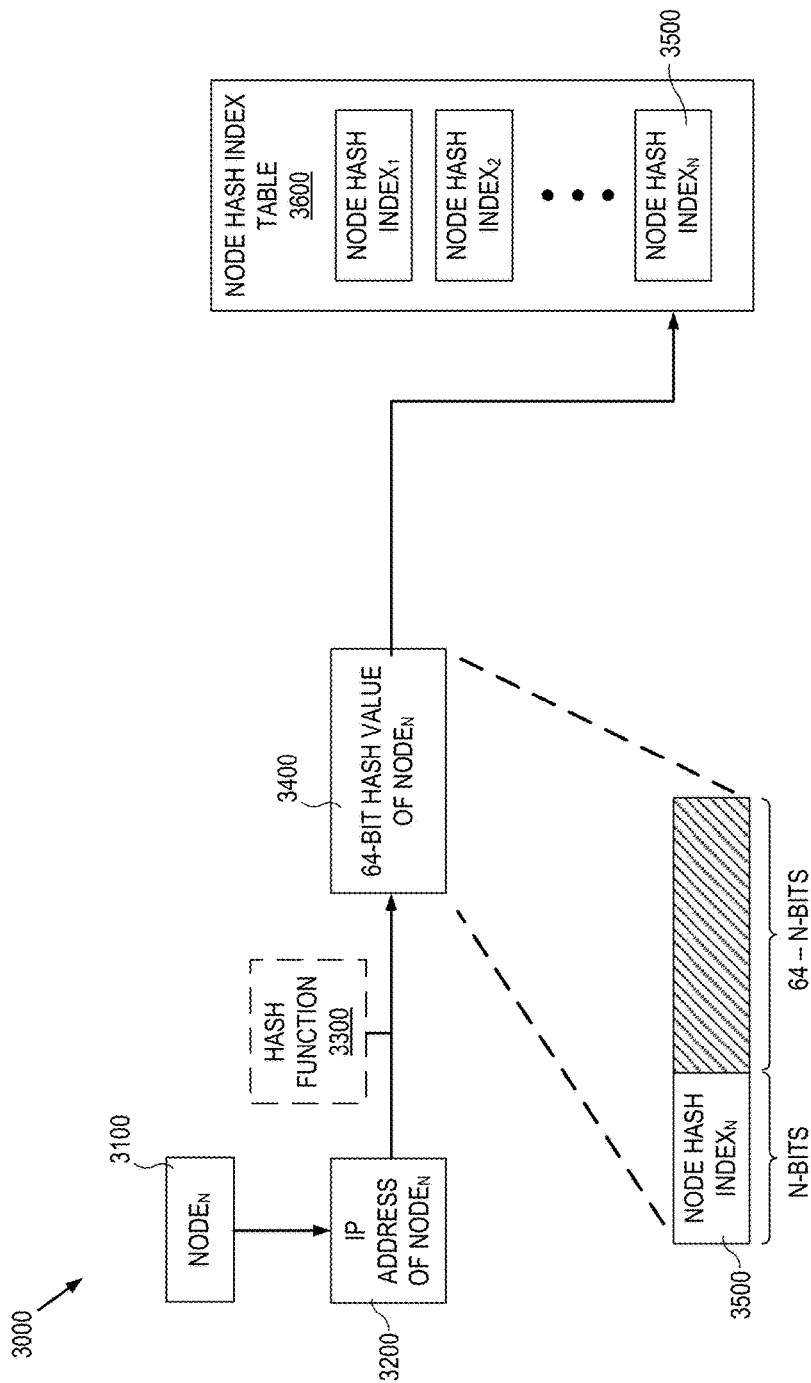
FIG. 3 illustrates an exemplary process for generating a node hash index, in accordance with embodiments described herein.

As shown in exemplary node hash indexing process 3000 of FIG. 3 and as stated above, the controller device may receive location information from a node 3100, which may include an IP address 3200 (e.g., characteristics, location, and/or the like) of the node 3100. Upon receipt, the controller device may utilize a hash function 3300 to transform the IP address 3200 of the node 3100 into a 64-bit node hash value 3400.

Next, the controller device may generate a node hash index 3500 of the node 3100. For example, the controller device may select a predetermined number of bits of the 64-bit node hash value 3400 to create the node hash index 3500. In some embodiments, the node hash index 3500 may include the first n-bits of the 64-bit node hash value 3400.

The controller device may then store the node hash index 3500 in a node hash index table 3600 of index values associated with identified nodes. This node hash index generation process 3000 may be repeated so that the controller device may populate the node hash index table 3600 with index values of nodes identified in the network. The hash table 3600 may be stored by the controller device in memory for later recall.

In some embodiments, the node hash index table 3600 may be sorted in ascending order and/or descending order based on hash index. For example, entries in the node hash index table 3600 may be sorted and/or arranged in ascending order according to the numerical values of the hash index entries. This sorting feature may enable quick comparison of hash indexes of nodes to hash indexes of data as described below.

Figure 4:
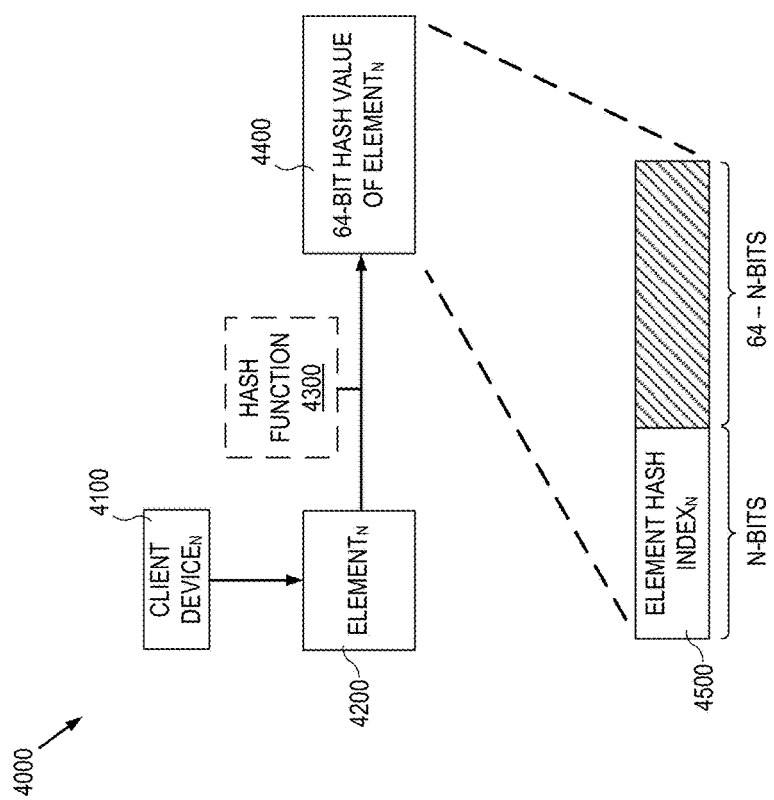
FIG. 4 illustrates an exemplary process for generating an element hash index, in accordance with embodiments described herein.

Referring now to element hash indexing process 4000 FIG. 4, the controller device may receive, perhaps from a client device 4100, an element 4200 (e.g., a data element, an index of a data element, an object, and/or other information) that is to be processed. In some embodiments, the element 4200 may include an index of an element that is already stored in the computing system. In other embodiments, the element 4200 may include identifying information associated with a node and/or a client device such as location information, as well as information associated with data such as metadata, a file size, instructions for processing, and/or the like.

Using a hash function 4300, the controller device may transform the element 4200 into a 64-bit element hash value 4400. The controller device may then generate an element hash index 4500 of the element 4200 using the 64-bit element hash value 4400. For example, the controller device may select a predetermined number of bits of the 64-bit element hash value 4400 to create the node hash index 4500. In some embodiments, the element hash index 4500 may include the first n-bits (e.g., predetermined number of bits) of the 64-bit element hash value 4400.

Figure 5:
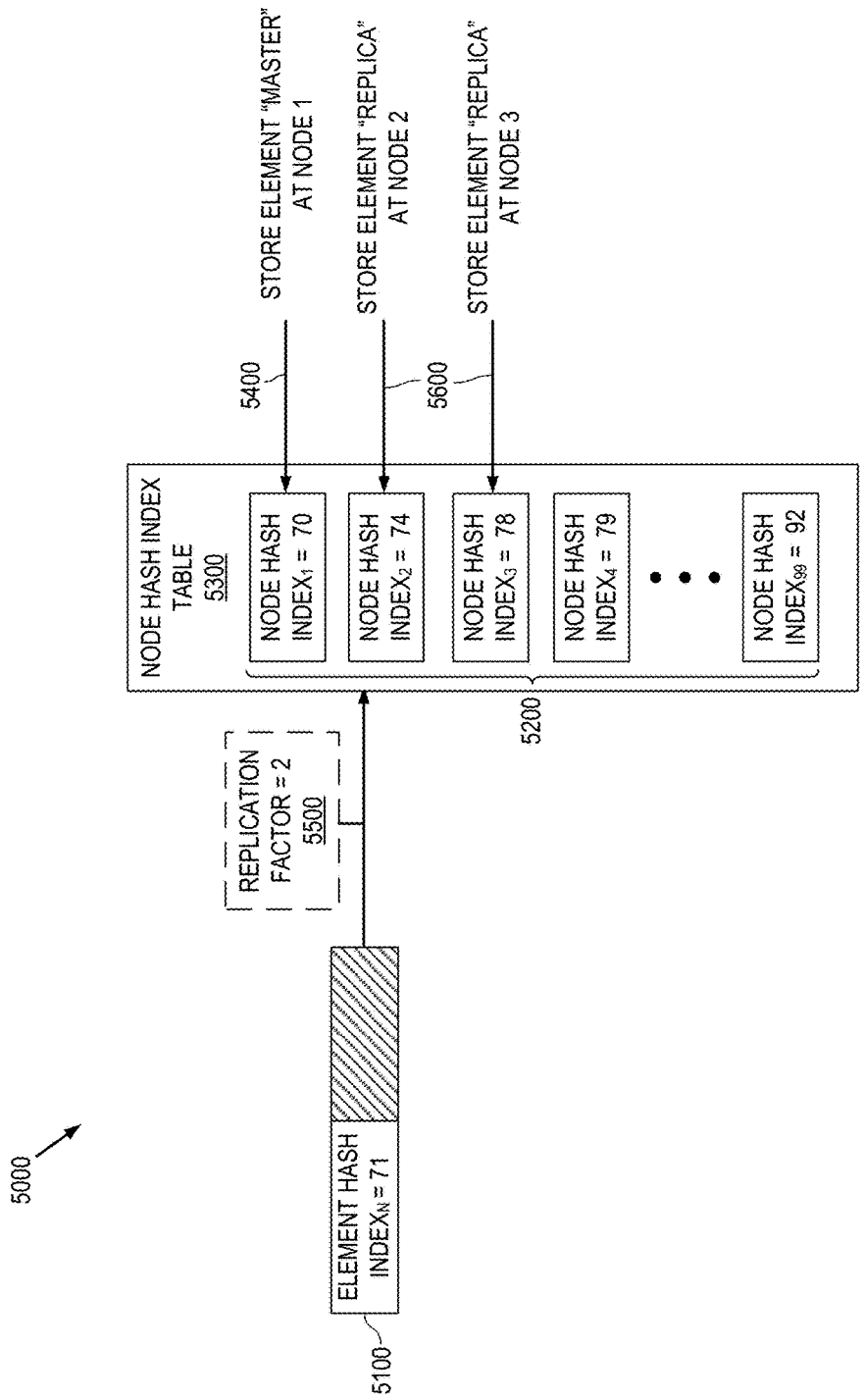
FIG. 5 illustrates an exemplary process for assigning data to a node for storage, in accordance with embodiments described herein.

Referring now to exemplary node assignment process 5000 of FIG. 5, the controller device may use the generated element hash index 5100 to assign the element to a node (e.g., a target node) for processing and/or storage. First, the controller system may determine a numerical value of the element hash index 5100. Next, the controller system may compare the element hash index 5100 to a plurality of node hash indexes 5200 stored in a node hash index table 5300 and associated with nodes in the network. The controller system may determine values for each of the node hash indexes 5200 in the node hash index table 5300. As stated above, the node hash indexes 5200 and/or table 5300 may be sorted in ascending order based on the determined values of the node hash indexes 5200.

The controller system may next identify a node hash index with a value that is closest to the value of the element hash index 5100. For example, as shown in FIG. 5, node hash index$_1$, which has a value of 70, most closely matches element hash index$_n$ 5100, which has a value of 71. Thus, the controller system may assign the element hash index 5100 (and thus the element) to the node hash index$_1$ 500 (and thus the associated node 1) so that the element "master" copy (e.g., an original copy of the element) may be processed by and/or stored in the target node (e.g., node 1 associated with the node hash index$_1$ 5400).

In addition to the master copy, a replica copy of the element may also be stored. The number of replica copies to be stored in the system may correspond to a replication factor 5500. The replication factor 5500 may be designated by a human user and/or may be predetermined. For example, as shown in FIG. 5, a user may wish to store two replica copies of the element in addition to the master copy to ensure safe and quick recall in the event of a network and/or node failure.

The controller device may assign the element to additional nodes based on the determined values of the hash indexes. For example, while the master copy of the element is assigned to the node 5400 associated with the node hash index with a value closest to the value of the element hash index 5100, the replica copies may be assigned to the node(s) 5600 associated with the node hash index with the next-closest value(s) to the value of the element hash index 5100. Element replica copies may thus be processed and/or stored by the additional (and next-closest) nodes 5600. In this manner, distance between nodes is minimized while retention of the element is maximized.

To reiterate, the master node 5400 and replica nodes 5600, 5600 may be assigned by comparing the value of the element hash index 5100 to the values of the node hash indexes 5200 arranged in the node hash index table 5300. Upon matching the value of the element hash index 5100 (71) to the node hash index 5400 with the closest value (70), the master copy of the element is assigned to the node hash index 5400 for processing and/or storage.

Because the replication number is set at 2, two additional nodes are to be assigned for processing and/or storage of replica copies of the element. As such, the replica copies of the element would be assigned to the nodes associated with the node hash indexes 5600 having the next closest values (74, 78) to the value of the element hash index 5100 (71).

Once the element has been assigned to one or more nodes, the controller device may next assign the element (e.g., each element copy) to one or more core processors of the assigned node. To do so, the controller device may utilize a modulo as seen in exemplary core processor assignment process 6000 of FIG. 6. For example, the value of the element hash index 6100 and the number of core processors included in an assigned node 6200 may be input into the modulo seen in FIG. 6. Upon solving the modulo, the integer remainder of the result may designate which core processor 6300 of the node 6200 the element is to be assigned (and thus stored and/or processed). Distributing the element in this essentially random manner may ensure that elements (e.g., data) are distributed substantially evenly across the core processors of a node and helps reduce data flow congestion.

Figure 6:
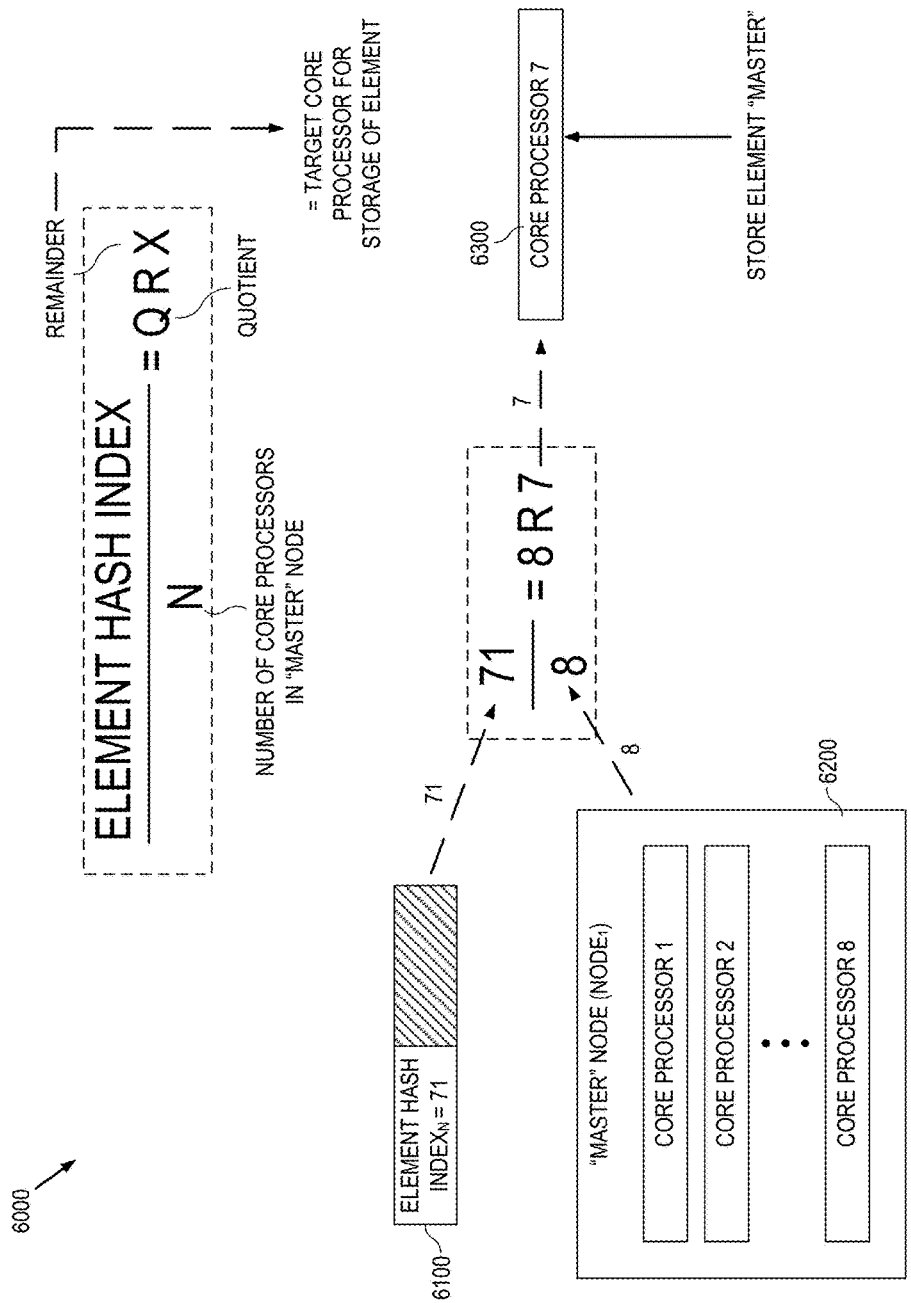
FIG. 6 illustrates an exemplary process for determining a core processor of a node to which data is to be stored, in accordance with embodiments described herein.

As illustrated in FIG. 6, the value of the element hash index 6100 (71) may be divided by a total number of core processors available at a target node 6200 (8). Once the operation is performed, the quotient (8) may be discarded; however, the remainder (7) may be used to assign the data to a target core processor 6300. For sake of the example of FIG. 6, core processor number 7 6300 of the node 6200 may be the target core processor and thus the element would be assigned to core processor number 7 6300 for processing and/or storage. Additionally, in embodiments where the replication factor is greater than zero and thus one or more nodes are assigned to process replicas of the element, the process 6000 of FIG. 6 may be performed to determine the target core processor 6300 for the replicas at each of the additional nodes as well as at the target node to which the master copy element is assigned.

While the controller device may be required to handle processing and/or storage of incoming data received from the client device, the system described herein may also need to reconfigure itself in response to the addition and/or subtraction of nodes, as well as network failures. Advantageously, and a substantial improvement upon existing designs, only certain data may need to be migrated during reconfiguration operations as opposed to having to reconfigure an entire library and/or datastore of element entries.

Figure 7:
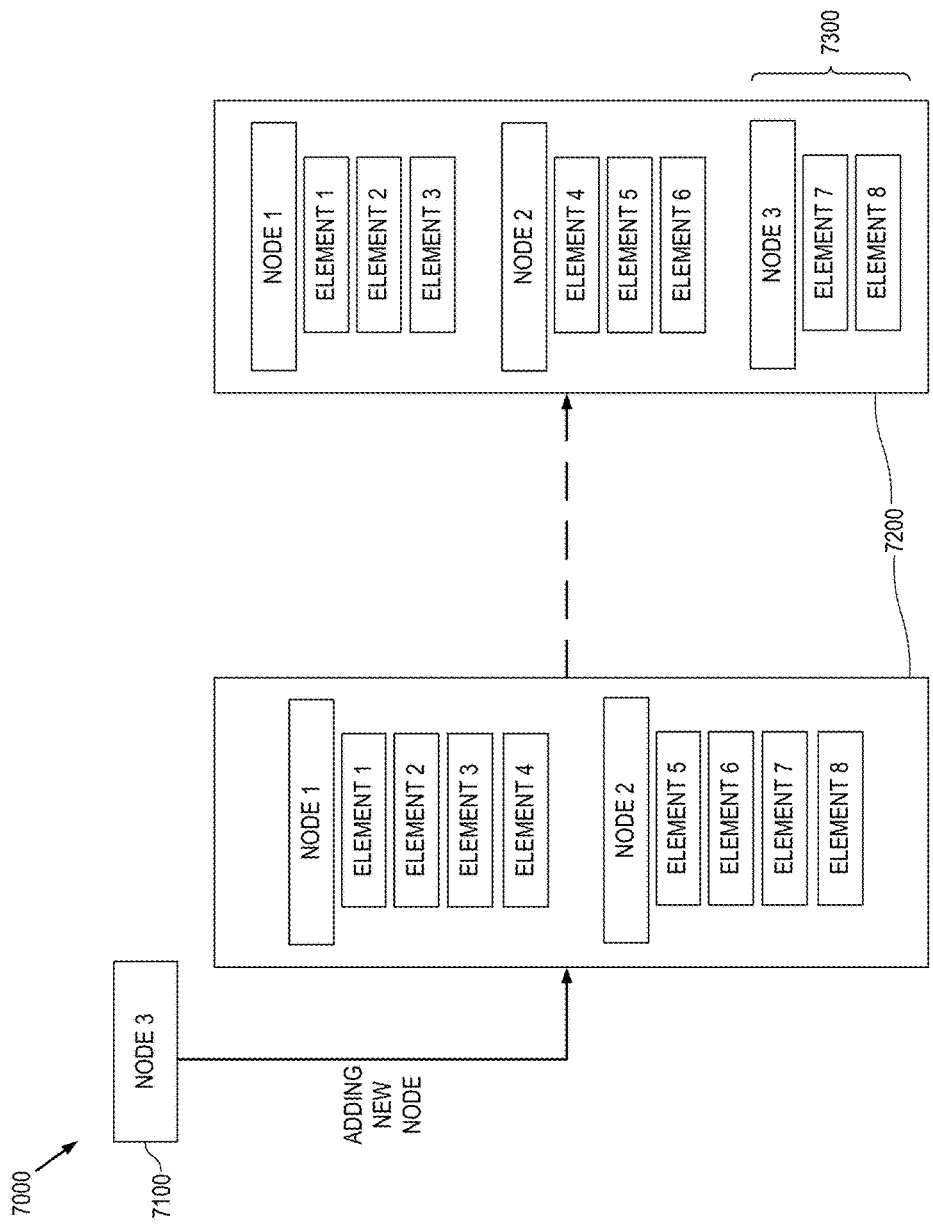
FIG. 7 illustrates an exemplary process for adding a node to a computing system, in accordance with embodiments described herein.

Referring now to FIG. 7, process 7000 illustrates an exemplary reconfiguration in response to adding a new node 7100. A new node 7100 may be added to the network and recognized by the controller device as described above. With the addition of the new node 7100 to the system, the hash table 7200 may undergo a rearrangement to accommodate the newly added node 7100. In a specific embodiment, the newly added node 7100 may be added into the existing hash table 7200 so that the resulting hash table 7200 remains in sequential order. In some embodiments, elements with element hash index values that are better matched (e.g., closer in value) to the value of the node hash index of the newly-added node 7100 may then undergo migration 7300 in the hash table 7200 from their current node(s) to the newly added node 7100.

Figure 8:
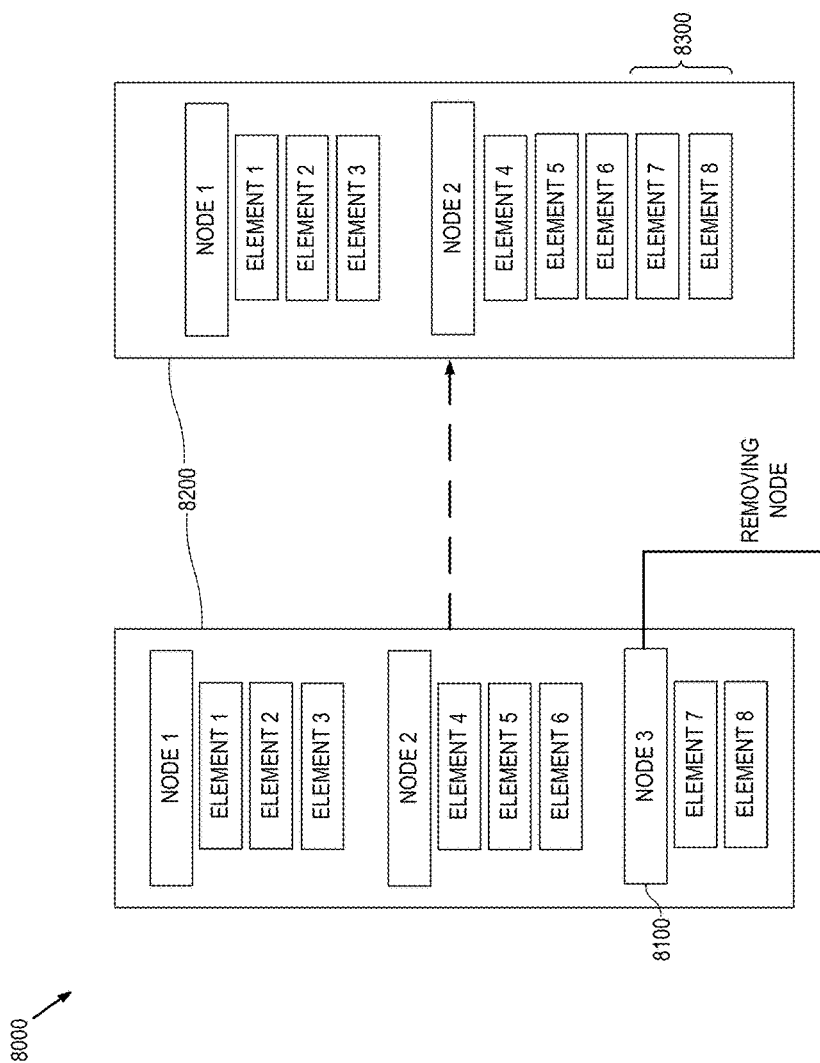
FIG. 8 illustrates an exemplary process for removing a node from a computing system, in accordance with embodiments described herein.

Similarly, and as demonstrated by the exemplary node removal process 8000 of FIG. 8, the removal of a node 8100 from the system may cause the hash table 8200 to undergo a rearrangement to accommodate the removal of the node 8100. In a specific embodiment, the controller device may remove the node hash index for the removed node 8100 from the hash table 8200 and reassign any elements that were previously assigned to the removed node 8100 to the remaining node(s) based on index value. More clearly, an element previously assigned to the removed node 8100 may be assigned to another node to which the value of the element hash index matches most closely.

In the event that a node in a network was to crash and/or fail, a similar procedure to process 8000 of FIG. 8 would occur. Elements previously assigned to a failed node, for example, would be reassigned to the next best-fitting node. Advantageously, because replicas may be stored in multiple locations throughout the system, the elements and their associated hash indexes may be quickly recalled for reconfiguration purposes.

In some embodiments, an element (e.g., a data entry) in the system may be maintained via the master copy. For example, a change to an element's master copy in one node may cause corresponding replica copies in other nodes to change as well. Deletes and/or modifications of elements and/or other data may be handled in a similar way.

Additionally, the controller device may determine that one or more nodes and/or core processors have sufficient computing resources for performing desired operations (e.g., processing and/or storing an element). Various pieces of information may be used to determine computing resource sufficiency, including location information, metadata associated with an element, file characteristics, device identification information, status information, and/or the like.

FURTHER COMMENTS

While various implementations in accordance with the disclosed principles have been described above, it should be understood that they have been presented by way of example only, and are not limiting. Thus, the breadth and scope of the implementations should not be limited by any of the above-described exemplary implementations, but should be defined only in accordance with the claims and their equivalents issuing from this disclosure. Furthermore, the above advantages and features are provided in described implementations, but shall not limit the application of such issued claims to processes and structures accomplishing any or all of the above advantages.

Various terms used herein have special meanings within the present technical field. Whether a particular term should be construed as such a "term of art," depends on the context in which that term is used. "Connected to," "in communication with," "communicably linked to," "in communicable range of" or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

Additionally, the section headings herein are provided for consistency with the suggestions under 37 C.F.R. 1.77 or otherwise to provide organizational cues. These headings shall not limit or characterize the implementations set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any implementations in this disclosure. Neither is the "Summary" to be considered as a characterization of the implementations set forth in issued claims. Furthermore, any reference in this disclosure to "implementation" in the singular should not be used to argue that there is only a single point of novelty in this disclosure. Multiple implementations may be set forth according to the limitations of the multiple claims issuing from this disclosure, and such claims accordingly define the implementations, and their equivalents, that are protected thereby. In all instances, the scope of such claims shall be considered on their own merits in light of this disclosure, but should not be constrained by the headings herein.

Lastly, although similar reference numbers may be used to refer to similar elements for convenience, it can be appreciated that each of the various example implementations may be considered distinct variations.

What is claimed is:

1. A system for efficiently distributing data within a multi-core data processing environment, wherein the system comprises:
    a client device communicatively coupled to a network, wherein the client device is configured for receiving, using a communication unit of the client device, an element to be at least one of processed and stored by the system;
    one or more nodes communicatively coupled to the network, wherein each node of the one or more nodes comprises one or more core processors configured for at least one of processing and storing the element;
    a node hash table communicatively coupled to the network, wherein the node hash table comprises a plurality of node hash indexes, and wherein each node hash index is associated with a node of the one or more nodes;
    a controller device communicatively coupled to the network, wherein the controller device is configured for:
        receiving, using a communication unit of the controller device, the element from the client device;
        transforming, using a hash indexing unit of the controller device, the element into an element hash value according to a hash function;
        generating, using the hash index unit of the controller device, an element hash index using at least a portion of the element hash value;
        cross-referencing, using a node assignment unit of the controller device, the element hash index with the plurality of node hash indexes;
        matching, using the node assignment unit of the controller device, a numerical value of the element hash index to a first numerical value of a first node hash index comprised in the node hash table, wherein the first node hash index is associated with a first node comprised in the one or more nodes;
        determining, using the node assignment unit of the controller device, a number of core processors comprised in the first node;
        identifying, using the node assignment unit of the controller device, a first target core processor of the first node using the numerical value of the element hash index and the number of core processors comprised in the first node; and
        transmitting, using a data transport unit of the controller device, the element to the first node, wherein the element is at least one of processed and stored by the first target core processor.

2. The system of claim 1, wherein the controller device is further configured for:
    identifying, using the node assignment unit of the controller device, the first node in the network;
    determining, using a location determination unit of the controller device, an Internet Protocol (IP) address of the first node;
    transforming, using the hash indexing unit of the controller device, the IP address of the first node into a 64-bit node hash value according to a hash function;
    generating, using the hash indexing unit of the controller device, the first node hash index using a portion of the 64-bit node hash value; and
    storing, using the hash indexing unit of the controller device, the first node hash index in the node hash table.

3. The system of claim 1, wherein the controller device is further configured for:
    matching, using the node assignment unit of the controller device, the numerical value of the element hash index to a second numerical value of a second node hash index associated with a second node comprised in the one or more nodes, wherein the first numerical value is closer to the numerical value of the element hash index than the second numerical value;
    determining, using the node assignment unit of the controller device, a number of core processors comprised in the second node;

determining, using the node assignment unit of the controller device, a second target core processor of the second node using the numerical value of the element hash index and the number of core processors comprised in the second node; and transmitting, using the data transport unit of the controller device, a replica of the element to the second node, wherein the replica of the element is at least one of processed and stored by the second target core processor.

4. The system of claim 1, wherein identifying the first target core processor of the first node using the numerical value of the element hash index and the number of core processors comprised in the first node further comprises:

dividing, using the node assignment unit of the controller device, the numerical value of the element hash index by the number of core processors comprised in the first node to thereby result in a result comprising a quotient portion and a remainder portion; and identifying, using the node assignment unit of the controller device, the first target core processor using the remainder portion.

5. The system of claim 1, wherein the element hash value comprises a 64-bit hash value, and wherein the element hash index comprises a predetermined number of bits of the 64-bit hash value.

6. The system of claim 1, wherein the controller device is further configured for:

assigning, using the node assignment unit of the controller device, the element hash index to the first node hash index in a hash table.

7. The system of claim 1, wherein the controller device is further configured for:

determining, using the node assignment unit of the controller device, that the first node has sufficient computing resources for performing the at least one of processing and storage of the element.

8. A computing apparatus, comprising:

at least one non-transitory computer readable storage medium comprising instructions; and at least one processing device configured to execute the instructions, wherein executing the instructions causes the at least one processing device to perform the operations of:

receiving, using a communication unit of the computing apparatus, an element to be at least one of processed and stored;

transforming, using a hash indexing unit of the computing apparatus, the element into an element hash value according to a hash function;

generating, using the hash index unit of the computing apparatus, an element hash index using at least a portion of the element hash value;

cross-referencing, using a node assignment unit of the computing apparatus, the element hash index with a plurality of node hash indexes stored in a node hash table, wherein each node hash index is associated with a node in a network;

matching, using the node assignment unit of the computing apparatus, a numerical value of the element hash index to a first numerical value of a first node hash index comprised in the node hash table, wherein the first node hash index is associated with a first node in the network;

determining, using the node assignment unit of the computing apparatus, a number of core processors comprised in the first node;

determining, using the node assignment unit of the computing apparatus, a first target core processor of the first node using the numerical value of the element hash index and the number of core processors comprised in the first node; and transmitting, using a data transport unit of the controller device, the element to the first node, wherein the element is at least one of processed and stored by the first target core processor.

9. The computing apparatus of claim 8, wherein executing the instructions further causes the at least one processing device to perform the operations of:

identifying, using the node assignment unit of the computing apparatus, the first node in the network;

determining, using a location determination unit of the computing apparatus, an Internet Protocol (IP) address of the first node;

transforming, using the hash indexing unit of the computing apparatus, the IP address of the first node into a 64-bit node hash value according to a hash function;

generating, using the hash indexing unit of the computing apparatus, the first node hash index using a portion of the 64-bit node hash value; and storing, using the hash indexing unit of the computing apparatus, the first node hash index in the node hash table.

10. The computing apparatus of claim 8, wherein executing the instructions further causes the at least one processing device to perform the operations of:

matching, using the node assignment unit of the computing apparatus, the numerical value of the element hash index to a second numerical value of a second node hash index associated with a second node in the network, wherein the first numerical value is closer to the numerical value of the element hash index than the second numerical value;

determining, using the node assignment unit of the computing apparatus, a number of core processors comprised in the second node;

determining, using the node assignment unit of the computing apparatus, a second target core processor of the second node using the numerical value of the element hash index and the number of core processors comprised in the second node; and transmitting, using the data transport unit of the computing apparatus, a replica of the element to the second node, wherein the replica of the element is at least one of processed and stored by the second target core processor.

11. The computing apparatus of claim 8, wherein executing the instructions that cause the at least one processor to perform the operations of determining the first target core processor using the value of the element hash index and the number of core processors comprised in the first node further causes the at least one processing device to perform the operations of:

dividing, using the node assignment unit of the computing apparatus, the numerical value of the element hash index by the number of core processors comprised in the first node to thereby result in a result comprising a quotient portion and a remainder portion; and identifying, using the node assignment unit of the computing apparatus, the first target core processor using the remainder portion.

12. The computing apparatus of claim 8, wherein the element hash value comprises a 64-bit hash value, and wherein the element hash index comprises a predetermined number of bits of the 64-bit hash value.

13. The computing apparatus of claim 8, wherein executing the instructions further causes the at least one processing device to perform the operations of:
assigning, using the node assignment unit of the computing apparatus, the element hash index to the first node hash index in a hash table.

14. The computing apparatus of claim 8, wherein executing the instructions further causes the at least one processing device to perform the operations of:
determining, using the node assignment unit of the computing apparatus, that the first node has sufficient computing resources for performing the at least one of processing and storage of the element.

15. A method comprising:
receiving, using a communication unit of a computing apparatus, an element to be at least one of processed and stored;
transforming, using a hash indexing unit of the computing apparatus, the element into an element hash value according to a hash function;
generating, using the hash index unit of the computing apparatus, an element hash index using at least a portion of the element hash value;
cross-referencing, using a node assignment unit of the computing apparatus, the element hash index with a plurality of node hash indexes stored in a node hash table, wherein each node hash index is associated with a node in a network;
matching, using the node assignment unit of the computing apparatus, a numerical value of the element hash index to a first numerical value of a first node hash index comprised in the node hash table, wherein the first node hash index is associated with a first node in the network;
determining, using the node assignment unit of the computing apparatus, a number of core processors comprised in the first node;
determining, using the node assignment unit of the computing apparatus, a first target core processor of the first node using the numerical value of the element hash index and the number of core processors comprised in the first node; and
transmitting, using a data transport unit of the controller device, the element to the first node, wherein the element is at least one of processed and stored by the first target core processor.

16. The method of claim 15, further comprising:
identifying, using the node assignment unit of the computing apparatus, the first node in the network;
determining, using a location determination unit of the computing apparatus, an Internet Protocol (IP) address of the first node;
transforming, using the hash indexing unit of the computing apparatus, the IP address of the first node into a 64-bit node hash value according to a hash function;
generating, using the hash indexing unit of the computing apparatus, the first node hash index using a portion of the 64-bit node hash value; and
storing, using the hash indexing unit of the computing apparatus, the first node hash index in the node hash table.

17. The method of claim 15, further comprising:
matching, using the node assignment unit of the computing apparatus, the numerical value of the element hash index to a second numerical value of a second node hash index associated with a second node in the network, wherein the first numerical value is closer to the numerical value of the element hash index than the second numerical value;
determining, using the node assignment unit of the computing apparatus, a number of core processors comprised in the second node;
determining, using the node assignment unit of the computing apparatus, a second target core processor of the second node using the numerical value of the element hash index and the number of core processors comprised in the second node; and
transmitting, using the data transport unit of the computing apparatus, a replica of the element to the second node, wherein the replica of the element is at least one of processed and stored by the second target core processor.

18. The method of claim 15, wherein determining the first target core processor of the first node using the value of the element hash index and the number of core processors comprised in the first node comprises:
dividing, using the node assignment unit of the computing apparatus, the numerical value of the element hash index by the number of core processors comprised in the first node to thereby result in a result comprising a quotient portion and a remainder portion; and
identifying, using the node assignment unit of the computing apparatus, the first target core processor using the remainder portion.

19. The method of claim 15, wherein the element hash value comprises a 64-bit hash value, and wherein the element hash index comprises a predetermined number of bits of the 64-bit hash value.

20. The method of claim 15, further comprising:
assigning, using the node assignment unit of the computing apparatus, the element hash index to the first node hash index in a hash table.

* * * * *